Figure 1:
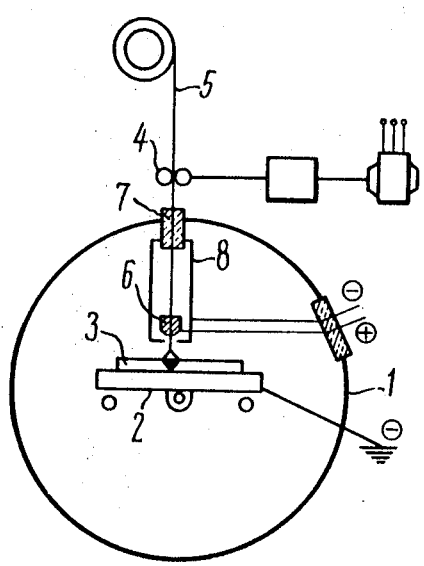

United States Patent

[11] 3,600,549

| [72] | Inventors | Nikolai Alexandrovich Olshansky<br>Pogonolosinoostrovskaya ulitsa 6, Kv. 2,<br>Moscow, U.S.S.R.;<br>Alexandra Vladimirovna Mordvintseva,<br>deceased, late of Moscow, U.S.S.R.<br>(Alexander Mordvintsev Leonide,<br>administrator, Peospekt Mira, 112 kv. 163,<br>Moscow, U.S.S.R.) |
|------|-----------|---|
| [21] | Appl. No. | 836,669 |
| [22] | Filed     | June 25, 1969 |
| [45] | Patented  | Aug. 17, 1971 |

[54] METHOD OF THE ARC WELDING AND DEPOSITION OF METALS IN VACUUM
4 Claims, 2 Drawing Figs.

[52] U.S. Cl. ................................................ 219/137, 219/130
[51] Int. Cl. .................................................. B23k 9/10
[50] Field of Search ...................................... 219/130, 131, 135, 137, 72, 74

[56] References Cited
UNITED STATES PATENTS

| 2,798,937 | 7/1957  | Miller ............................ | 219/131   |
| 2,933,594 | 4/1960  | Johnson et al. ................ | 219/72 X  |
| 3,284,609 | 11/1966 | Allen et al. .................... | 219/135   |
| 3,431,390 | 3/1969  | Moinz ............................ | 219/135 X |

*Primary Examiner*—J. V. Truhe
*Assistant Examiner*—C. L. Albritton
*Attorney*—Waters, Roditi, Schwartz & Nissen

ABSTRACT: A method of the arc welding and deposition of metals in vacuum by means of a consumable electrode, in which for the purpose of providing the stable arcing process between the electrode wire and the workpiece, the arc is stabilized by shielding the current-carrying parts of one of the electrodes with the aid of a metal envelope having a charge corresponding to the charge of the other electrode.

METHOD OF THE ARC WELDING AND DEPOSITION OF METALS IN VACUUM

The present invention relates to welding practice, and more particularly, it concerns methods of arc welding and deposition of metals in vacuum. The method according to the invention may be used to advantage for the welding and deposition of all metals and alloys, especially of light and active metals and alloys.

Widely used in the prior art is a method for the arc welding and deposition of metals in inert gases, for example, argon.

This method has proved to be successful when welding metals having a comparatively small thickness (10—15 mm.), but if the thickness increases, the mechanical properties of the weld metal and, therefore, of the welded joint deteriorate.

Also known in the prior art is a method of electroslag welding of metals having a thickness greater than 20 mm. Nevertheless, the electroslag welding of light and active metals does not provide for obtaining the properties of the metal of the welded joint similar to those of the base metal. The main reasons which account for a poor quality of the welded joint produced with the aid of the known methods, consist in insufficient protection of the metal of the welded joint, a great number of welding beads (if the argon arc welding is employed), and the difficulties encountered when selecting a flux (when the electroslag welding is employed).

In order to eliminate the above-said disadvantages, attempts have been made to effect the process of arc welding in vacuum; however, this method does not provide for a stable arc discharge in vacuum of $10^{12}$ mm. mercury column.

To provide for a stable arc discharge attempts have been made to admit an inert gas into the arcing zone or to use magnetic stabilization of the process.

The admission of the inert gas into the arcing zone allows the arc to be stabilized; yet, this reduces the efficiency of the vacuum protection and deteriorates the electrical and economic characteristics of the process (the depth of fusion, deposition rate factor). The vacuum welding with the magnetic stabilization of the arc is a pure vacuum method to be resorted to during the welding of materials having rather a small thickness (less than 5—6 mm.) by means of nonconsumable electrodes. When using a nonconsumable electrode, particularly if a welding current exceeds 300 amperes, when making root welds of metals having a thickness exceeding 20 mm., especially when welding ferromagnetic metals, it is not possible to induce a stabilizing magnetic field.

An object of the present invention is to eliminate the above-mentioned disadvantages.

The specific object of the invention is to provide such a method of the arc welding and deposition of metals in vacuum, which would make it possible to effect the process of welding heavy gauge metals by means of a consumable electrode with dependable stabilization of the arcing process.

This object is attained by providing a method of the welding and deposition of metals in vacuum by means of a consumable electrode with a stabilization of the arcing in which, according to the invention, the stabilization of the arcing process is provided by shielding the current-carrying parts of one of the electrodes, for example the wire, with the aid of a metal envelope having a charge corresponding to that of the other electrode, for example of the article being welded. The presence of the metal envelope ensures stable arcing only between the electrode wire and the article being welded, and prevents development of the "parasitic" arcing process between the current-carrying parts.

Figure 2:
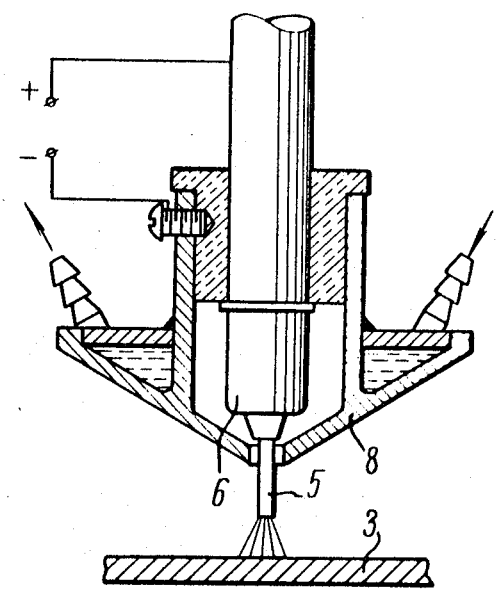

The nature of the present invention will be made more fully apparent from a consideration of the following description of an exemplary embodiment thereof, taken in conjunction with the accompanying drawings, in which:

FIG. 1 illustrates a circuit diagram of the apparatus for a vacuum arc welding by means of a consumable electrode; and FIG. 2 is a schematic diagram of the current-carrying wire in a tip shielded with a metal envelope.

The purposed process is carried into effect in a vacuum chamber 1 (FIG. 1) accommodating a workpiece 3 to be welded, which is mounted on a movable table 2 electrically connected to the chamber and negative terminal of the current source, the workpiece 3 being one of the welding electrodes.

The welding wire is fed into the upper portion of the vacuum chamber by means of a head 4. The welding wire is supplied with the welding current through a tip 6. The input of the tip 6 and the welding wire are electrically insulated from the chamber by means of an insulator 7 which at the same time is a sealing device, whereas the tip is connected to the positive terminal of the power source.

To stabilize the arcing process and to eliminate "parasitic" discharges between the workpiece being welded and the tip, these members are shielded by a metal envelope 8 (FIGS. 1 and 2) having an opening in the lower portion for passing the welding wire. The metal envelope and the tip are connected to an additional low power supply source so that the polarity of the workpiece being welded and that of the metal are the same. In this case, the voltage of the additional power supply source may be varied within a wide range.

The proposed method may be also effected without using an additional power source.

In this case, the "parasitic" discharges are eliminated due to the fact that when striking the electric arc, the metal envelope stores an electric charge whose polarity is similar to that of the workpiece.

According to the proposed method, the workpiece with the edges, having been prepared in the usual manner, is placed on the table 2 mounted in the vacuum chamber.

The chamber is hermetically sealed and provided with a vacuum of at least $10^{12}$ mm. mercury column. Thereafter, the electric arc is stricken between the welding wire and the workpiece. In this case, the metal of the wire is melted down and deposited onto the workpiece.

The welded workpieces manufactured with the aid of the vacuum welding process feature high mechanical properties, particularly, when welding active and refractory metals, because, as it is known, the metal being melted in a vacuum contains smaller proportion of gases and impurities.

The tests of the proposed method used for welding and deposition of aluminum and titanium alloys have shown that the process characteristics of the vacuum arc welding are superior to the same characteristics of the argon arc welding in many respects. For example, the fusion and deposition rate factors during the vacuum arc welding are increased by a factor of five; the metal of the welded joint produced in a vacuum of $5.10^{12}$ mm. mercury column contains dissolved gases and other impurities in an amount by as much as 2 to 3 times lower than that attainable during the other processes of welding, while the mechanical properties of the welded workpiece and of the metal of the welded joint made by the use of the vacuum arc welding approach the properties of the base metals and alloys to be welded. For example, during the welding of aluminum alloys having the thickness of 20 to 60 mm., the mechanical strength of the welded joint amounts up to 95 percent of the mechanical strength of the base metal, whereas during the welding of titanium alloys having the thickness within the range of 10 to 50 mm., the obtained impact value of the weld metal considerably exceeds the impact strength of the base metal.

We claim:

1. A method of arc welding and depositing metals in a vacuum comprising providing a workpiece and a consumable electrode in a vacuum opposite one another in spaced relation, said workpiece constituting an electrode, producing respective charges in the workpiece and consumable electrode to provide an electric arc therebetween, shielding the consumable electrode with a metallic envelope having opposite open ends through which the consumable electrode is movable and insulated therefrom, and producing in the metallic envelope a charge corresponding in polarity to the charge in the workpiece.

2. A method as claimed in claim 1 wherein the charge produced in the metallic envelope is produced by the electric arc and stored in the metallic envelope.

3. A method as claimed in claim 1 including connecting the consumable electrode and the metallic envelope to an independent power supply for producing the charge in the metallic envelope.

4. A method as claimed in claim 3 wherein the metallic envelope and the consumable electrode are connected to the negative and positive poles respectively of the independent power supply and wherein the workpiece is charged negatively.